Oct. 5, 1965 H. J. KOZICKI 3,209,852
VEHICLE SUSPENSION
Filed April 6, 1964 3 Sheets-Sheet 2
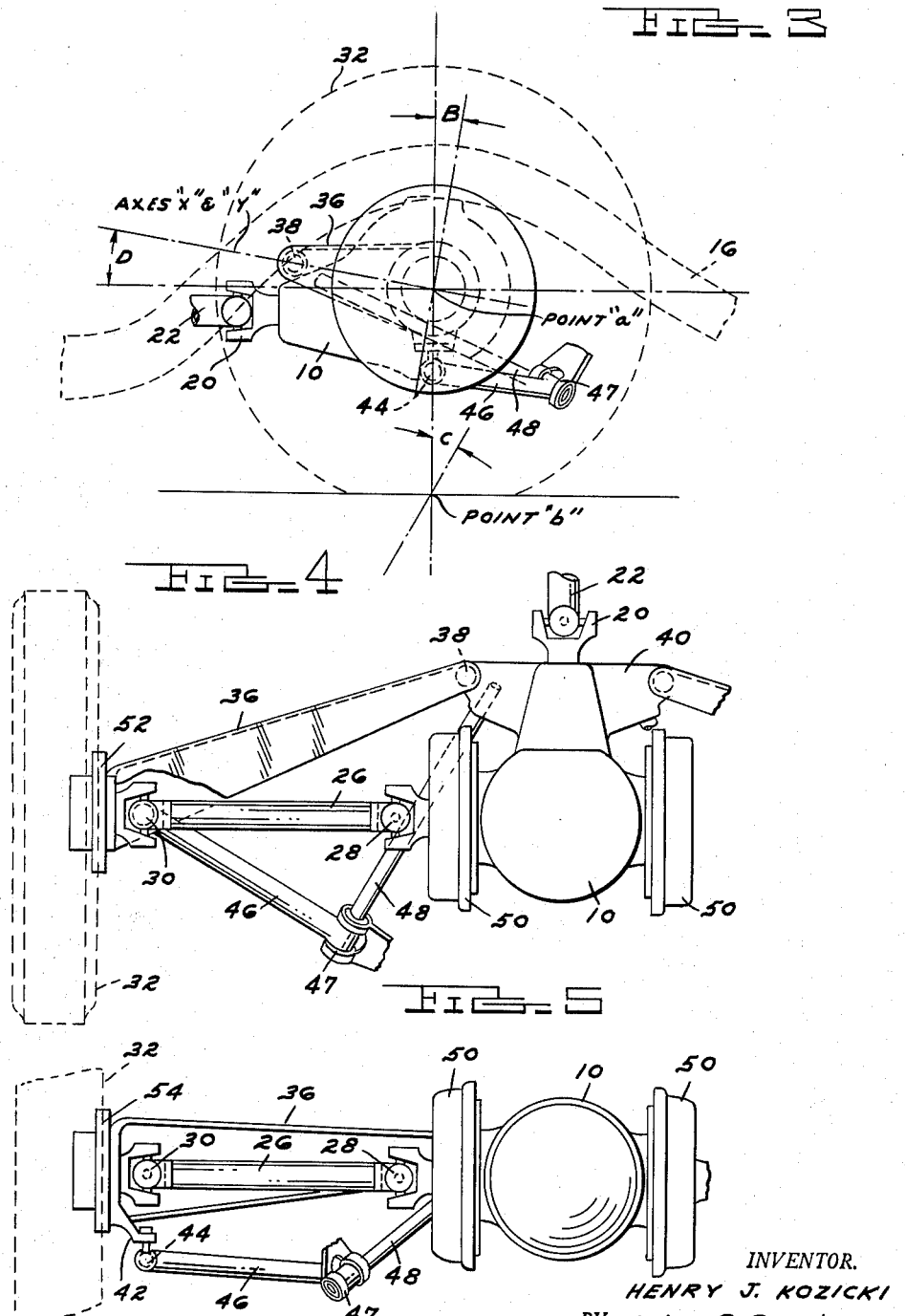
INVENTOR.
HENRY J. KOZICKI
BY John R. Faulkner
Clifford L. Sadler
ATTORNEYS

# United States Patent Office 3,209,852
Patented Oct. 5, 1965

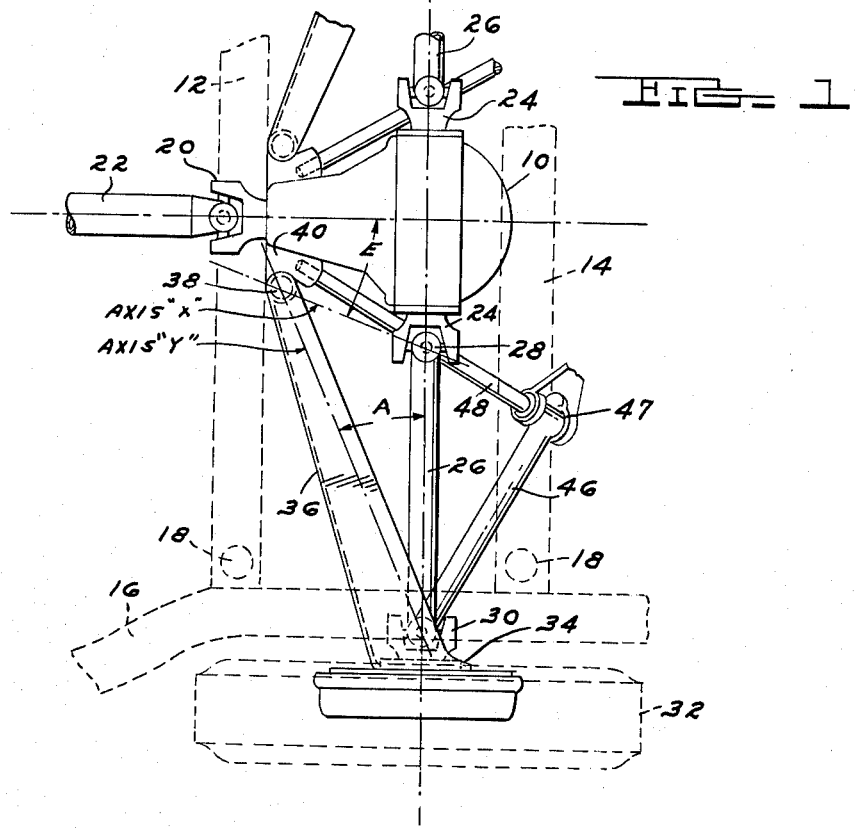
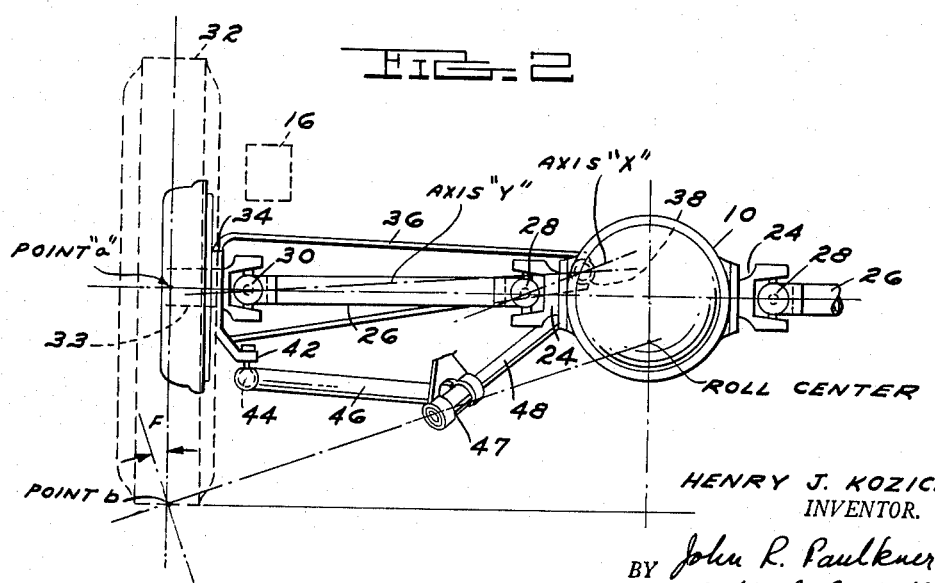

3,209,852
VEHICLE SUSPENSION
Henry J. Kozicki, Orchard Lake, Mich., assignor to Ford Motor Company, Dearborn, Mich., a corporation of Delaware
Filed Apr. 6, 1964, Ser. No. 357,725
9 Claims. (Cl. 180—73)

This application is a continuation in part of copending (now abandoned) application for Letters Patent Serial Number 121,692, filed July 3, 1961.

The present invention relates to vehicle suspension systems and more particularly to independent rear suspensions.

It is the principal object of the present invention to provide an independent rear suspension system for a motor vehicle that is so constructed as to have anti-lift characteristics during braking and anti-squat characteristics during acceleration.

More specifically, the present invention provides an independent rear suspension having a rigid arm attached to the wheel bearing housing. A half-shaft is provided which functions as a suspension link. A control link is also provided to stabilize the wheel and arm structure.

The objects and advantages of the present invention will be fully comprehended from the following description and accompanying drawings in which:

FIGURE 1 is a top plan view of an independent rear vehicle suspension incorporating the presently preferred embodiment of this invention;

FIGURE 2 is a rear elevational view of the suspension of FIGURE 1;

FIGURE 3 is a side elevational view of the suspension of FIGURE 1;

FIGURE 4 is a top plan view of a modification of the suspension of FIGURE 1;

FIGURE 5 is a rear elevational view of the suspension of FIGURE 4; and

Figure 6:
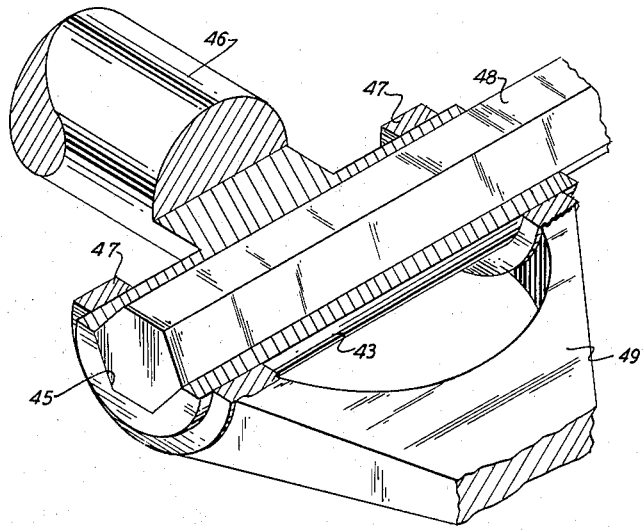
FIGURE 6 is an enlarged view partially in section showing the connection between the control link, torsion bar and support bracket of the suspension.

Referring now to the drawings wherein the presently preferred embodiments of this invention are disclosed, like reference numerals identify like parts throughout the various views. FIGURE 1 discloses an independent rear suspension system having a differential housing 10 secured to cross-frame members 12 and 14 of a vehicle chassis. The cross-frame members 12 and 14 have their end portions affixed to frame side rails 16 by means of rubber pucks or cushion members 18. Thus, the differential 10 and associated drive train mechanism are isolated from the vehicle chassis by means of the rubber elements 18.

The differential 10 has an input universal joint 20 to receive power or driving torque from an input or propeller shaft 22 and output shafts or axles 24 extending from each of its sides. The differential outputs 24 are each connected to a half-shaft 26 by a universal joint 28. The outer end of the half-shaft 26 has a universal joint 30 to which the stub axle 33 of a road wheel 32 is connected. Thus, torque transmitted from the propeller shaft 22 passes through the differential 10 and is divided between the left and right half-shafts 26 to the road wheels 32.

The stub shaft 33 is keyed to the wheel 32 and is rotatably supported by a wheel bearing housing 34. The wheel bearing housing 34 carries the brake backing plate of the wheel brake assembly. A suspension arm 36 is rigidly affixed to the housing 34 and extends forwardly and inwardly therefrom to a ball joint connection 38. The joint 38 is situated where the forward end of the differential housing 10 is secured to the isolated cross-frame member 12. A bracket member 40 is provided at this point to carry the ball joint 38 of the arm 36.

A bracket arm 42 extends downwardly from the wheel bearing housing 34 and carries a ball joint 44 to which a control link 46 is affixed. The control link extends inwardly and rearwardly from the ball joint 44. The inner terminus of link 46 has a transverse portion 43 with a hexagonal bore 45. A torsion bar 48 is provided with a hexagonal end that is fitted into the bore 45. A bracket 49 having a bifurcated bushing portion 47 journals the end 43 of link 46. The bracket 49 is securely connected to the frame member 14 in a conventional fashion not shown.

The torsion bar 48 extends inwardly, upwardly and forwardly from its connection with link 46 and has its forward end rigidly secured to the bracket 40. Rotation of the link 46 is thus permitted about the fixed axis of the bifurcated bushing 47 which is coincident with the center line of the bar 48. Thus, movement of the control link 46 loads the bar 48 in torsion for the resilient support of the vehicle chassis on the wheel suspension structure.

It is commonly recognized in the suspension design field that the characteristics of a suspension can be defined by determining the paths of various key points on the wheel. This technique is a short-cut to a complete force analysis. For example, rather than show a breakdown of forces in numerous suspension links, arms and pivots during braking in order to determine the amount of anti-dive, it is accepted in the industry that the anti-lift force in the rear suspension is the product of the braking thrust at the ground and the tangent of the angle (to the vertical) the ground-to-tire contact point makes when describing its up and down travel (with brakes locked).

FIGURES 1, 2 and 3 present a new type of independent rear suspension system whose operation will be described in terms of such wheel path travel. Based on common knowledge in this field, the suspension will be analysed for anti-brake lift forces in terms of the travel of point "b" in the side view FIGURE 3 (the ground-to-tire contact point), for anti-squat forces in terms of the travel of point "a" in the side view FIGURE 3 (the wheel center), for roll center in terms of the travel of point b in the end view FIGURE 2, for camber change in terms of the travel of both points a and b in the end view, FIGURE 2.

As previously described, the suspension consists of a suspended axle carrier or differential 10 mounted to the chassis by appropriate cross members 12, 14 and rubber mounts 18 in the usual manner of deDion axles. The half-shafts 26, carrying universal joints 28 and 30 at their inner and outer ends, each acting as a link of finite length between the differential output 24 and wheel 32. The rigid connection of the suspension arm 36 with the brake backing plate and wheel bearing housing 34 provides an integral structure of wheel and arm. It terminates in its inboard extremity in a ball joint 38 which may be attached to either the differential housing 10 or the front cross member 12 by means of appropriate bracket devices such as bracket 40.

The control link 46 is attached to the wheel structure by the ball joint 44 at a point below the universal joint 30 and at its inboard extremity to a frame cross member 14 by means of the bushing 47 of bracket 49. The end 43 of link 46 is a convenient place to introduce the spring medium which, in the present embodiment, is the torsion spring 48 that extends forwardly to an anchor point on the bracket 40. The entire suspension configuration is isolated from the chassis by means of the cross members 12, 14 and their rubber mounts 18.

It is apparent that the half-shaft 26 and arm 36 form a rigid triangle in the plane determined by the half-shaft and the arm ball joint 38 (triangle of included angle A). This triangle may oscillate about the axis "x" during wheel travel. Because the arm 36 and wheel 32 are connected to the half-shaft 26 in part by the universal joint 30, oscillation about axis "y" will occur to the degree permitted by the control link 46.

Geometry studies have demonstrated that when the wheel 32 moves vertically, causing the outer universal joint 30 to oscillate about the axis $x$ and in conjunction with the control exercised by the link 46 on the wheel-arm structure 34–36, point $a$ in the side view (FIGURE 3) will travel up and rearwardly at an angle B. Angle C is the angle to the vertical traversed by the ground contact point $b$, and angle B is approximately 8 to 10 degrees and smaller than angle C as required for proper anti-squat characteristics. To a great extent this angle B is determined by the angle the arm 36 takes to the horizontal in the side view FIGURE 3. This latter angle is indicated by the reference D. The actual path of point $a$, of course, need not be a straight line and more probably is a curve dependent in a large part on the inclination of axis $x$ (angle E).

By the proper selection of angle A and the appropriate positioning of the inner end 43 of control link 46, point $b$ can be made to describe a path of inclination for one hundred percent anti-brake lift. For that purpose, angle C is selected to be about 25 to 30 degrees. In the end view FIGURE 2, point $b$ describes an angle F for an effective roll center height of approximately 6 to 8 inches for proper roll and steer characteristics.

Also in the end view FIGURE 2, point $a$ describes an arc approximately equal to the length of the half-shaft 26. In so doing, and with the arc of point $b$, wheel camber changes are achieved such that the wheels stay approximately square to the ground when the car rolls.

FIGURES 4 and 5 disclose modifications of the invention corresponding to FIGURES 1 and 2, respectively. In these figures the arrangement of the arm 36, half-shafts 26, control links 46 and torsion bar spring 48 is generally similar to the first embodiment. The principal distinction is the inboard mounting of the brake assemblies 50. This is in contrast to the construction of the suspension shown in FIGURES 1, 2 and 3 where the brake assembly is mounted at the wheel 32 in conjunction with the wheel bearing housing 34. In the present situation, the outer end of the suspension arm 36 is rigidly affixed to the wheel bearing housing 52. In the case of the structure of FIGURES 4 and 5, the geometry needs to be changed only slightly. The travel of the ground contact point $b$ is no longer of interest as the brakes have been taken off the wheel. In this modification, the angle B is increased slightly so that the travel of point $a$ is appropriate for anti-squat forces.

The novel constructions shown in FIGURES 1 to 5 provide an independent rear suspension which has full anti-squat and anti-lift characteristics, as well as other desirable qualities. Attention is directed to the simplicity of parts and pivots. Aside from the half-shaft universal joints, only three pivots are required.

The foregoing description presents the preferred embodiments of this invention. Modifications and alterations may occur to those skilled in the art which will come within the spirit and scope of the following claims.

I claim:
1. An independent suspension system for sprung and unsprung vehicle parts having a wheel drivingly connected to a nonextensible articulated driving axle, said axle being connected to said sprung vehicle parts, a first arm universally connected to a sprung part and rigidly connected to an unsprung wheel support part, and a wheel positioning control link universally connected to a member rigidly affixed to said unsprung part at one end and pivotally connected to a member rigidly affixed to said sprung part at its other end, said link and said axle combining to define the camber characteristics of said wheel during jounce and rebound movement.

2. In an independent suspension system for a motor vehicle having sprung and unsprung suspension components, a nonextensible axle shaft assembly having inner and outer universal joints, said shaft assembly interconnecting sprung and unsprung components, a suspension arm rigidly secured to an unsprung component at one end and pivotally connected to a sprung component at its other end, a control link having an outer end pivotally connected to a member rigidly affixed to said unsprung components, the opposite end of a member rigidly affixed to said control link having a pivotal connection to said sprung components, a suspension spring interposed between said sprung and unsprung components, the center of the pivotal connection between said arm and said sprung component and the center of said inner universal joint defining two points on an axis about which said unsprung components swing during jounce and rebound suspension movement, the pivotal connections at the ends of said control link being vertically displaced from the plane containing said axis and the center of said outer universal joint.

3. An independent suspension system for a motor vehicle having sprung and unsprung suspension components comprising a nonextensible articulated driving axle interconnecting said components, a suspension arm rigidly secured to said unsprung components and extending inwardly and forwardly therefrom, said arm having a universal connection to said sprung components, a control link having an outer end pivotally connected to a member rigidly affixed to said unsprung components and an opposite end having a pivotal connection to a member rigidly affixed to said sprung components, said axle and said arm lying in a substantially common plane, said control link being vertically spaced from said common plane, a suspension spring interposed between said sprung and unsprung components.

4. An independent suspension system for a motor vehicle having sprung and unsprung suspension components comprising a nonextensible articulated axle shaft interconnecting said components, a suspension arm rigidly secured to said unsprung components and extending inwardly and forwardly therefrom, said arm having a universal connection to said sprung components, a control link having an outer end pivotally connected to a member rigidly affixed to said unsprung components and extending inwardly and rearwardly therefrom, the opposite end of said control link having a pivotal connection to a member rigidly affixed to said sprung components, a suspension spring interposed between said sprung and unsprung components, the pivotal connections at the ends of said control link being vertically displaced from the plane containing the axis of said articulated axle and the center of the connection between said arm and said sprung components.

5. An independent suspension system for a motor vehicle having sprung and unsprung parts, a suspension arm structure pivotally connected to a sprung part at one end and having a wheel journalled at its other end, an articulated nonextensible driving axle interconnecting said wheel and a sprung part, said axle being constructed to rotate with said wheel, wheel positioning control link means pivotally connected to said other end of a member rigidly affixed to said structure and to a member rigidly affixed to said sprung part, said control link being vertically spaced from the horizontal plane containing said driving axle, a suspension spring interposed between said parts.

6. A vehicle having an independent suspension system comprising a frame, a subframe resiliently mounted on said frame, a differential gear unit secured to said subframe, a nonextensible shaft assembly extending laterally from one side of said differential gear unit, said assembly having an inner universal joint drivingly connected to the power output means of said unit, a road wheel connected to the outer end of said shaft assembly by an outer universal joint, wheel support structure rotatably supporting said wheel, a suspension arm having a first end rigidly connected to said wheel support structure and a second end universally connected to said subframe, said suspension arm extending forwardly and inwardly from said wheel support structure, a wheel positioning control link having a first end pivotally connected to said wheel support structure and a second end pivotally connected to said subframe, a torsion bar spring having one of its ends secured to said subframe and the other of its ends secured to said link at said second end, the center of said inner universal joint and the center of the universal connection between said suspension arm second end and said subframe comprising two points on a pivot axis about which said wheel swings during jounce and rebound movement, said control link and said shaft assembly combining to define the camber characteristics of said wheel during jounce and rebound movement.

7. A vehicle having an independent suspension system comprising a frame, a differential gear unit secured to said frame, a nonextensible shaft assembly extending laterally from one side of said differential gear unit, said assembly having an inner universal joint drivingly connected to the power output means of said unit, a road wheel connected to the outer end of said shaft assembly, wheel support structure rotatably supporting said wheel, a suspension arm having a first end rigidly connected to said wheel support structure and a second end universally connected to said frame, a wheel positioning control link having a first end pivotally connected to a member rigidly affixed to said wheel support structure and a second end pivotally connected to a member rigidly affixed to said frame, the center of said inner universal joint and the center of the universal connection between said suspension arm second end and said frame comprising two points on a pivot axis about which said wheel swings during jounce and rebound movement, the first and second ends of said control link being vertically displaced from the plane containing said pivot axis and the center of said wheel, said control link and said shaft assembly combining to define the camber characteristics of said wheel during jounce and rebound movement, spring means supporting the sprung mass of said vehicle on said wheel.

8. A vehicle having an independent suspension system comprising a frame, a subframe resiliently mounted on said frame, a differential gear unit secured to said subframe, a nonextensible shaft assembly extending laterally from one side of said differential gear unit, said assembly having an inner universal joint drivingly connected to the power output means of said unit, a road wheel connected to the outer end of said shaft assembly by an outer universal joint, wheel support structure rotatably supporting said wheel, a suspension arm having a first end rigidly connected to said wheel support structure and a second end universally connected to said subframe, said suspension arm extending forwardly and inwardly from said wheel support structure, a wheel positioning control link having a first end pivotally connected to said wheel support structure and a second end pivotally connected to said subframe, the center of said inner universal joint and the center of the universal connection between said suspension arm second end and said subframe comprising two points on a pivot axis about which said wheel swings during jounce and rebound movement, the first and second ends of said control link being vertically displaced from the plane containing said pivot axis and the center of said outer universal joint, said control link and said shaft assembly combining to define the camber characteristics of said wheel during jounce and rebound movement, spring means supporting the sprung mass of said vehicle on said wheel.

9. An independent suspension system for a motor vehicle comprising a frame, a road wheel, a differential gear unit secured to said frame, a nonextensible drive shaft assembly extending laterally from one side of said differential gear unit, said assembly including an inner universal joint drivingly connected to the power output means of said unit and an outer universal joint drivingly connected to said road wheel, wheel support structure rotatably supporting said wheel, a suspension arm having a first end rigidly connected to said wheel support structure and a second end pivotally connected to said frame, a wheel positioning control link having a first end pivotally connected to said wheel support structure and a second end pivotally connected to said frame, the center of said inner universal joint and the center of the pivotal connection between said suspension arm second end and said frame comprising two points on a pivot axis about which said wheel swings during jounce and rebound movement, said first and second ends of said control link being vertically displaced from the plane containing said pivot axis and the center of said outer universal joint, said control link and said shaft assembly combining to define the camber characteristics of said wheel during jounce and rebound movement.

References Cited by the Examiner

UNITED STATES PATENTS

| 2,811,214 | 10/57 | Uhlenhaut et al. | 180—73 |
| 2,815,084 | 12/57 | Fortgang et al. | 180—73 |
| 3,020,061 | 2/62 | Rosenkrands | 280—104 |
| 3,101,126 | 8/63 | Kerr | 180—64 |

FOREIGN PATENTS

| 493,412 | 10/38 | Great Britain. |
| 920,109 | 11/54 | Germany. |
| 1,190,265 | 3/59 | France. |

BENJAMIN HERSH, *Primary Examiner.*

A. HARRY LEVY, *Examiner.*